United States Patent
Mrkos et al.

(10) Patent No.: US 10,129,271 B2
(45) Date of Patent: Nov. 13, 2018

(54) TRACKING USERS OVER NETWORK HOSTS BASED ON USER BEHAVIOR

(71) Applicant: Cisco Technology, Inc., San Jose, CA (US)

(72) Inventors: Jan Mrkos, Uvaly (CZ); Martin Grill, Prague (CZ); Jan Kohout, Roudnice nad Labem (CZ)

(73) Assignee: Cisco Technology, Inc., San Jose, CA (US)

( * ) Notice: Subject to any disclaimer, the term of this patent is extended or adjusted under 35 U.S.C. 154(b) by 36 days.

(21) Appl. No.: 14/723,605

(22) Filed: May 28, 2015

(65) Prior Publication Data

US 2016/0352760 A1    Dec. 1, 2016

(51) Int. Cl.
*H04L 29/06* (2006.01)
*H04L 29/08* (2006.01)
*H04L 29/12* (2006.01)

(52) U.S. Cl.
CPC ...... *H04L 63/1416* (2013.01); *H04L 63/1425* (2013.01); *H04L 67/02* (2013.01); *H04L 67/22* (2013.01); *H04L 67/303* (2013.01); *H04L 61/103* (2013.01); *H04L 61/2015* (2013.01); *H04L 63/0281* (2013.01)

(58) Field of Classification Search
CPC ............ H04L 63/1416; H04L 63/0281; H04L 61/2076; H04L 67/02; H04L 67/22; H04L 67/303; H04L 61/6068; H04L 63/1425; H04L 61/2015; H04L 61/103
USPC .......................................................... 726/3
See application file for complete search history.

(56) References Cited

U.S. PATENT DOCUMENTS

| | | | |
|---|---|---|---|
| 7,383,333 B2 | 6/2008 | Philyaw et al. | |
| 7,403,978 B2 | 7/2008 | Parekh et al. | |
| 7,600,020 B2 | 10/2009 | Busch et al. | |
| 7,698,377 B2 | 4/2010 | Parekh et al. | |
| 8,463,942 B2 | 6/2013 | Parekh et al. | |
| 8,661,119 B1 | 2/2014 | Jindal et al. | |
| 8,745,269 B2 | 6/2014 | Parekh et al. | |
| 8,789,171 B2 | 7/2014 | Osipkov et al. | |
| 8,918,903 B1 * | 12/2014 | Schepis | G06F 21/316 709/224 |
| 9,003,012 B2 | 4/2015 | Balasubramanian et al. | |

(Continued)

OTHER PUBLICATIONS

Herrmann, et a., "Behavior-based tracking: Exploiting characteristic patterns in DNS traffic," Computers & Security, vol. 39, Part A, Nov. 2013, pp. 17-33.*

(Continued)

*Primary Examiner* — Jeffrey D Popham
(74) *Attorney, Agent, or Firm* — Edell, Shapiro & Finnan, LLC

(57) ABSTRACT

A method of tracking users over network hosts based on behavior includes analyzing data representing behavior of active network hosts during two or more time windows at a computing apparatus having connectivity to a network. Based on the analyzing, a profile is generated for each network host active in the network during the two or more time windows. Similarity between the profiles for the two or more time windows are determined and, based on the similarity, it may be determined that an identity associated with one of the active network hosts during a time window of the two or more time windows has changed.

20 Claims, 10 Drawing Sheets

(56) References Cited

U.S. PATENT DOCUMENTS

| | | |
|---|---|---|
| 2013/0124309 A1 | 5/2013 | Traasdahl et al. |
| 2014/0089491 A1 | 3/2014 | Nadler et al. |
| 2014/0122386 A1 | 5/2014 | Nahum et al. |
| 2016/0182657 A1* | 6/2016 | Mukherjee ............. H04L 67/22 709/223 |

OTHER PUBLICATIONS

Zhang et al., "Understanding Bag-of-Words: A Statistical Framework", 16 pages (Aug. 2010).
Karen Spärck Jones, "A statistical interpretation of term specificity and it's application in retrieval", reprinted from Journal of Documentation, vol. 60, No. 5, 2004, pp. 493-502, Copyright © MCB University Press, ISSN 0022-0418; and previously from Journal of Documentation, vol. 28, No. 1, 1972, pp. 11-21, 9 pages.
Harold W. Kuhn, "Chapter 2: The Hungarian Method for the Assignment Problem", article originally appeared in Naval Research Logistics Quarterly 2 (1955) pp. 83-97, 19 pages.
Salton et al., "A Vector Space Model for Automatic Indexing", Communications of the ACM, Nov. 1975, vol. 18, No. 11, pp. 613-620, 8 pages.
Turney et al., "From Frequency to Meaning: Vector Space Models of Semantics", Journal of Artificial Intelligence Research 37 (2010), Feb. 2010, pp. 141-188, 48 pages.
Abramson, et al., "User Authentication from Web Browsing Behavior," Proceedings of the Twenty-Sixth International Florida Artificial Intelligence Research Society Conference, May 2013, pp. 268-273.
Chen, et al., "COWES: Web User Clustering Based on Evolutionary Web Sessions," Data & Knowledge Engineering, vol. 68, May 2009, pp. 867-885.
Mobasher, et al., "Discovery and Evaluation of Aggregate Usage Profiles for Web Personalization," Data Mining and Knowledge Discovery, vol. 6, Issue 1, Jan. 2002, pp. 61-82.
Yang, et al.,"Toward user patterns for online security: Observation time and online user identification," Decision Support Systems, vol. 48, Issue 4, Mar. 2010, pp. 548-558.
Evangelista, et al., "Data Fusion for Outlier Detection through Pseudo-ROC Curves and Rank Distributions," International Joint Conference on Neural Networks (IJCNN '06), Jul. 2006, pp. 2166-2173.
Robertson, "Understanding Inverse Document Frequency: On theoretical arguments for IDF," Journal of Documentation, vol. 60, No. 5, Oct. 2004, pp. 503-520.
Abramson, "Learning Temporal User Profiles of Web Browsing Behavior," 2014 ASE Bigdata/Socialcom/ Cybersecurity Conference, May 2014, pp. 1-8.
Brown, et al., "An exploration of user recognition on domestic networks using NetFlow records," 2014 ACM International Joint Conference on Pervasive and Ubiquitous Computing Adjunct Publication (UBICOMP '14 ADJUNCT), Sep. 2014, pp. 903-910.
Herrmann, et al., "Behavior-based tracking: Exploiting characteristic patterns in DNS traffic," Computers & Security, vol. 39, Part A, Nov. 2013, pp. 17-33.
Kumpošt, et al., "User Profiling and Re-identification: Case of University-Wide Network Analysis," 6th International Conference on Trust, Privacy & Security in Digital Business (Trustbus 2009), Sep. 2009, pp. 1-10.
Yang, "Web user behavioral profiling for user identification," Decision Support Systems, vol. 49, Issue 3, Jun. 2010, pp. 261-271.
S. Chaudhari, et al., "User and Device Tracking in Private Networks by Correlating Logs: A System for Responsive Forensic Analysis", 2014 Fourth International Conference on Communication Systems and Network Technologies (CSNT), Apr. 7-9, 2014, Bhopal, India, DOI: 10.1109/CSNT.2014.253, 6 pages.

* cited by examiner

TRACKING USERS OVER NETWORK HOSTS BASED ON USER BEHAVIOR

TECHNICAL FIELD

The present disclosure relates to tracking users over network hosts in a network.

BACKGROUND

As network technology has advanced, it has become easier to connect a variety of devices to networks. Consequently, many enterprises are now allowing employees to bring their own devices and connect these devices, including mobile devices, to an enterprise network in accordance with "bring your own device" policies. In order to assign host network addresses, such as Internet Protocol (IP), to an employee's device, various protocols are used, such as Dynamic Host Configuration Protocol (DHCP) that may cause user devices to be assigned different host network addresses over different time periods. Due, at least in part, to protocols like DHCP and "bring your own device" policies, many networks, and specifically enterprise networks, frequently have a significant number of unidentified users connected thereto (e.g., users that are not identified with a username or other such explicit identifier). In fact, in many enterprise networks over 50% of the users are unidentified users, and in some enterprise networks 100% of the users are unidentified users.

DESCRIPTION OF EXAMPLE EMBODIMENTS

Overview

According to at least one example embodiment, a method of tracking users over network hosts based on behavior includes analyzing data representing behavior of active network hosts during two or more time windows at a computing apparatus having connectivity to a network. Based on the analyzing, a profile is generated for each network host active in the network during the two or more time windows. Similarity between the profiles for the two or more time windows is determined and, based on the similarity, it may be determined that an identity associated with one of the active network hosts during a time window of the two or more time windows has changed.

Example Embodiments

Presented herein is a system and methods for tracking network users and, in particular, for determining a change in identity and tracking the identity of dynamically assigned network hosts. To determine that a user identity associated with a network host has changed, information contained in Hypertext Transfer Protocol (HTTP) proxy logs, such as visited domains, used User-Agents, and the network host's activity over time may be analyzed. Models may then be used to create a profile for specific time windows and the profiles may then be used to identify that a user associated with a given network host has changed. In some embodiments, the profiles may also be used to map a user to a newly assigned network host. The resultant mappings can then be used with network intrusion detection and management systems to facilitate a number of tasks, such as detecting identity theft or hijacking, determining virtual communities, detecting access violations, authenticating user identities, and/or tracing infected hosts in a network.

Figure 1:
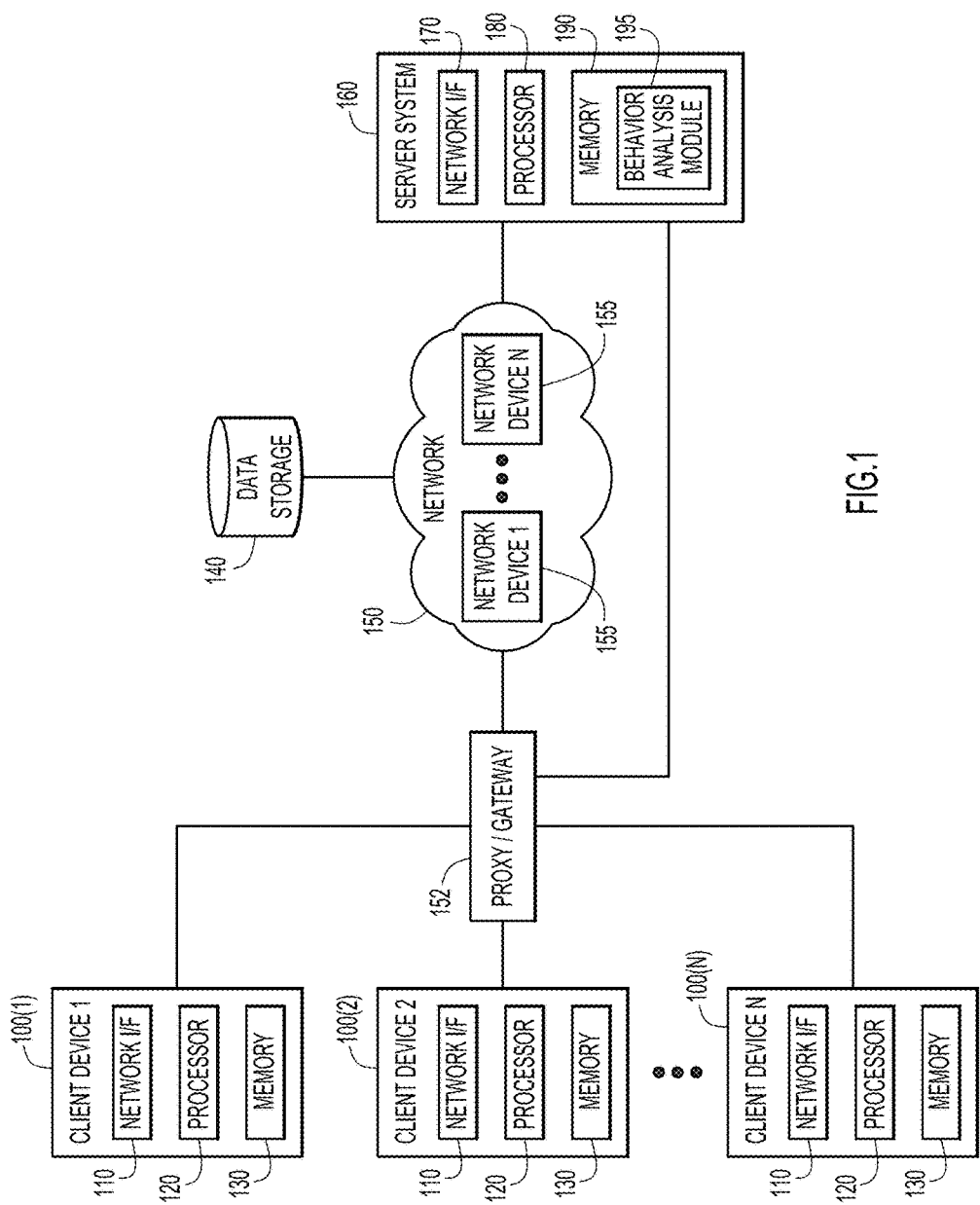
FIG. 1 is a block diagram of a network system environment in which users may be tracked over network hosts based on behavior, according to an example embodiment.

Referring first to FIG. 1, an example network system environment for tracking users over network hosts based on behavior is shown. The environment includes one or more server systems 160, one or more data storages 140, and one or more client devices 100(1)-100(N) that may be remote from each other and connected over a network 150. The network 150 may include one or more network devices 155 configured to allow the data storage 140, client devices 100, and server systems 160 communicate with each other and may include a wide area network (WAN), one or more local area networks, wireless networks, etc. The data storage 140 may be any conventional storage system, including one or more databases. The behavior of client devices 100(1)-100(N) is observed with regard to one or more networks 150 located behind one or more data collection points, such as proxy/gateway 152. The proxy/gateway 152 serves to collect network data related to the behavior of the client devices 100(1)-100(N), which data is then made available to the data storage 140 and ultimately to the server system 160.

Server systems 160 and client devices 100(1)-100(N) may be embodied by any type of computer device or system. In the depicted embodiment, each client device 100(1)-100(N) includes a network interface 110, a processor 120, and a memory 130. Similarly, the server system 160 includes a network interface 170, a processor 180, and a memory 190. The client devices 100 and server systems 160 may also include a display or monitor and any input devices, such as a keyboard or mouse The processor 120, 180 are, for example, one or more microprocessors or microcontrollers that may communicate with the network interfaces 110, 170, respectively. Memory 130 and 190 store software instructions that may be executed by the respective processors 120, 180. For example, memory 130 for device 100 may store instructions for performing the profile generation and similarity determination functions described below with reference to FIGS. 2-10. In other words, memory 130 and/or memory 190 may include instructions, that when executed by one or more processors, cause the one or more processors to carry out the operations described below in connection with FIGS. 2-10.

Memory 130 and 190 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 130 and 190 may be or include one or more tangible (non-transitory) computer readable storage media (e.g., a memory device) encoded with software comprising computer executable instructions.

The server system 160 may also include a behavior analysis module 195. In the depicted embodiment, the behavior analysis module 195 is embodied by software instructions stored in memory 190 of the server system 160, but in other embodiments, the behavior analysis module 195 may be implemented across any number of server systems 160 and/or clients 100(1)-100(N). The behavior analysis module 195 may be implemented by any combination of software and/or hardware. The behavior analysis module 195 includes instructions that, when executed by one or more processors, are configured to cause the one or more processors to perform the techniques described herein in connection with FIGS. 2-10

Figure 2:
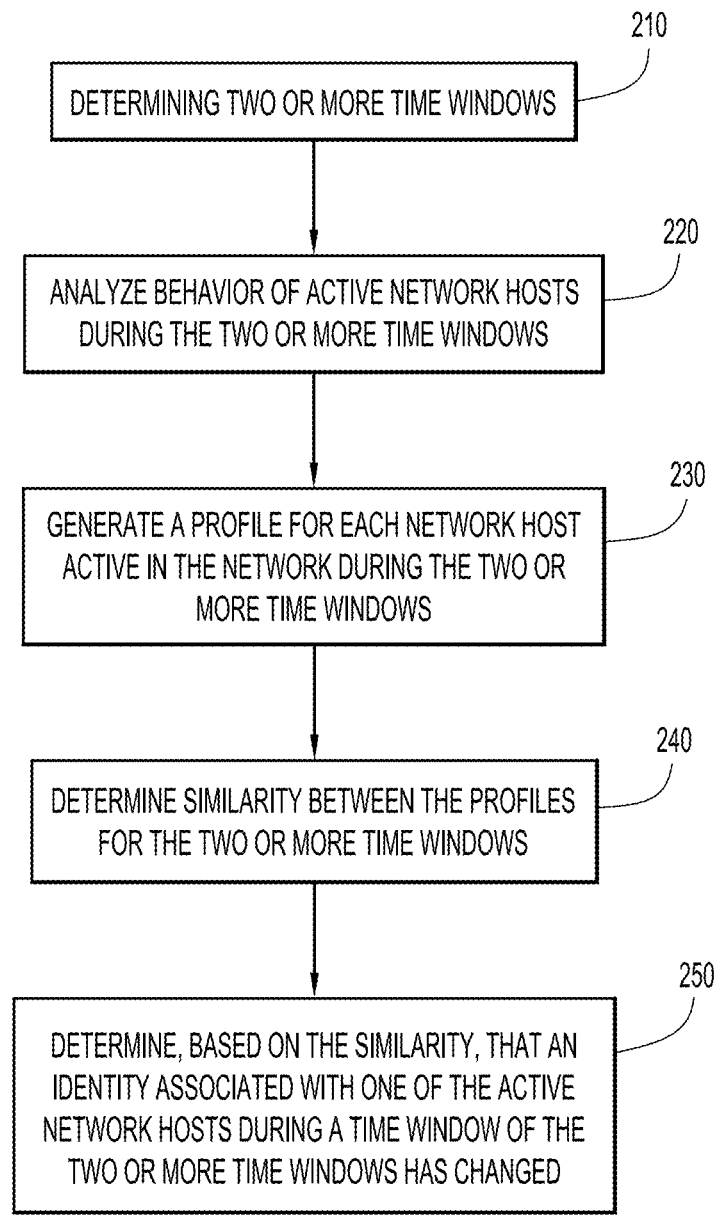
FIG. 2 is a high-level flowchart illustrating a process for tracking users over network hosts based on network activity behavior, according to an example embodiment.

Reference is now made to FIG. 2 for a high-level description of the behavior based user tracking, such as performed by execution of the software instructions of behavior analysis module 195. At step 210, two or more time windows are selected or determined from a span of time to allow a user to be tracked over time. The two or more time windows may be of any desirable length (e.g., a day each). In some embodiments the time windows may overlap. In other embodiments, the time windows are discrete, such that each time window covers a different period of time. For example, in some embodiments, discrete time windows are selected from time $T_1$ to time $T_N$ and a user identity can be tracked between network hosts during time windows from $T_{i-1}$ to $T_i$ and $T_i$ to $T_{i+1}$ where i is greater than 1 and at least one less than N. In other words, in some embodiments, the discrete time windows may be consecutive, non-overlapping time windows of variable durations. In some embodiments, data associated with network activity of network hosts during the two or more time windows is accumulated and stored in the data storage 140 (FIG. 1), but, in other embodiments data stored in the data storage 140 can be extracted from storage 140 and sorted into two or more time windows. In other words, in some embodiments, time windows may be selected in real time and in other embodiments, time windows may be selected subsequent to collecting the network related data and storing it in the data storage 140. In any case, the network data of the behavior of the client devices is captured over the selected time windows.

At step 220, the behavior of network hosts that are active during the two or more time windows is analyzed. In order to analyze the behavior of network hosts, any data relating to network activity and/or usage of a particular network, such as HTTP packets exchanged over the network, may be extracted from the data storage 140 and that data is analyzed in order to determine how often a specific host is visiting certain websites, using certain browsers, to determine the level and type of activity of each network host over time. In some embodiments, the data relating to network usage of a particular network host may be analyzed in order to determine when a particular network host began accessing the network during a certain time window (e.g., when a person begin working on a particular day), the IP address of a destination server (e.g., the server that a network host is connecting to), the second level domains being accessed, a host name, a User-Agent, an autonomous system being utilized, a geographical location from which that a network host is accessing the network, a geographical location where a visited domain is hosted, and/or an amount of client-server and/or server-client bytes being utilized.

Based on this analysis, profiles are generated, at step 230, for each active network host during the two or more time windows. For example, a profile may be generated for each IP address that is in use. As is discussed below in connection with FIG. 5, the profile may be determined based on one or more behavior models or factors. The profile may be based on one or more behavior models of network usage over time, web sites visited, and browsers used to access the Internet. In generating these profiles, it is assumed that an identity associated with a particular network host is not changed (i.e., a user does not switch between network hosts) within one time window. Thus, only one profile is generated for each network host during each time period. However, since the time windows can be of any desirable length, multiple shifted time windows of different sizes may be used to model users switching between different network hosts at different times.

In some embodiments, profiles are generated for each active host by generating a first set of profiles for each network host that is active during a first time window and generating a second set of profiles for each network host that is active during a second time window. The profiles are not necessarily different; instead, at least some of the profiles included in the first set of profiles may be similar or otherwise correspond to the profiles included in the second set. Regardless of how the profiles are generated for the active network hosts, a similarity may be determined between the profiles for the two or more time windows at step 240. As is discussed in detail below, the similarity may be determined by comparing data for each of the profiles. Based on the similarity, it may be determined, at step 250, that an identity associated with one of the active network hosts during a time window has changed.

Figure 3:
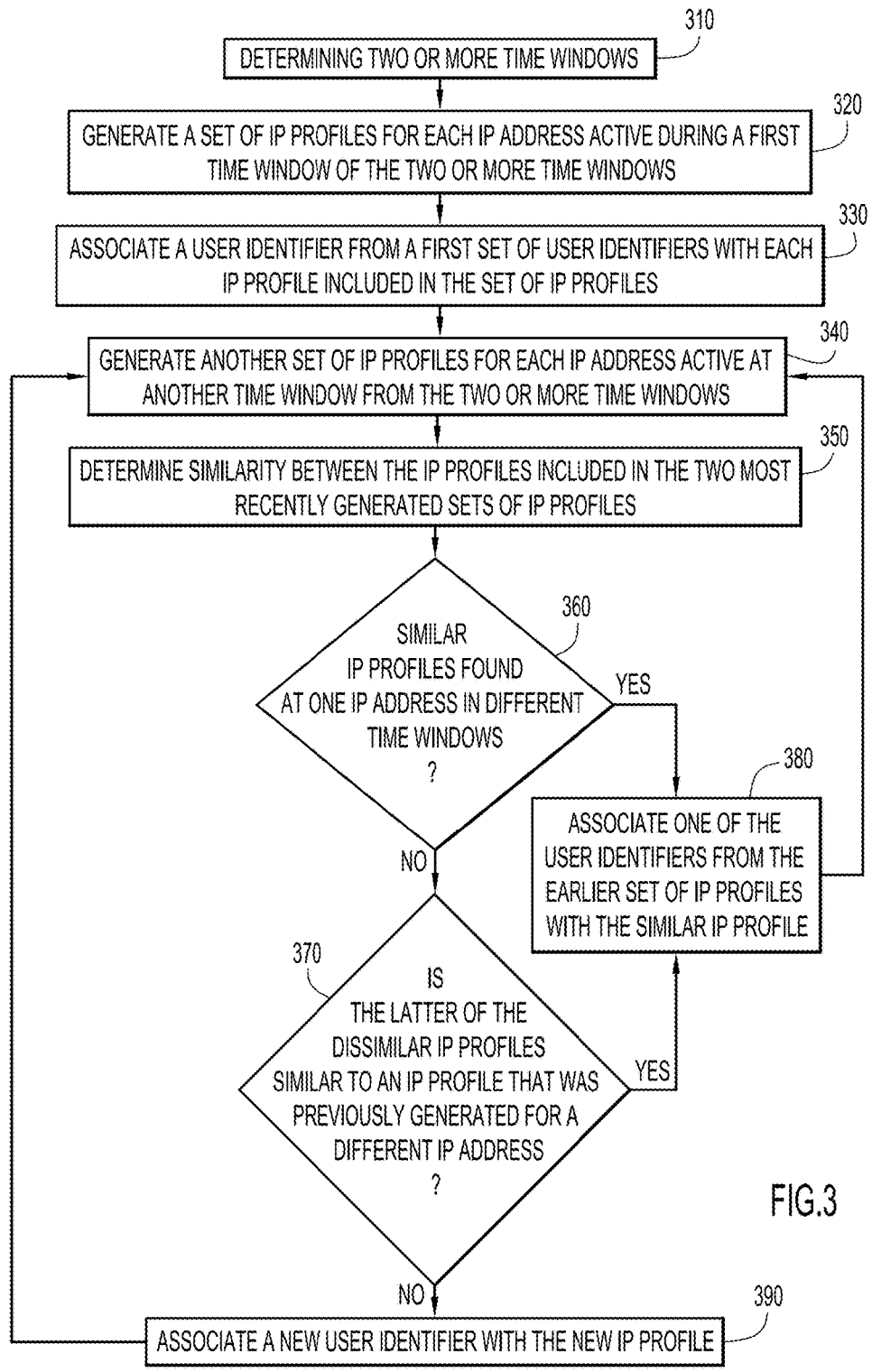
FIG. 3 is a flowchart illustrating a process for tracking users over IP addresses based on network activity behavior, according to another example embodiment.
Figure 4:
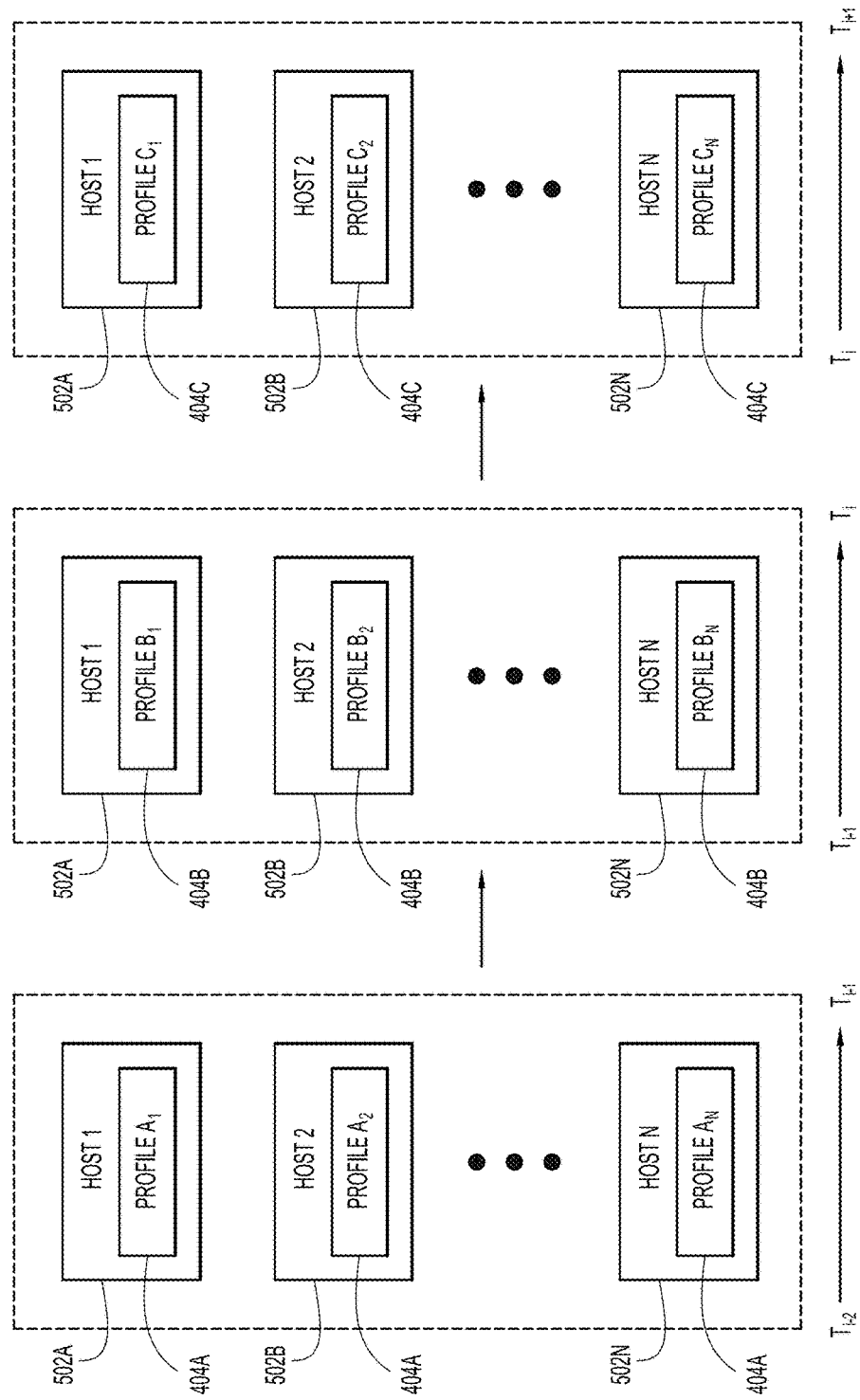
FIG. 4 is a diagram depicting a process for generating profiles for active network hosts, according to an example embodiment.

Reference is now made to FIGS. 3 and 4. FIG. 3 illustrates a flow chart depicting one example process for detecting change in identity of an active network host. In the example embodiment illustrated in FIG. 3, a process is shown for detecting a change in user identity for an IP address and, thus, IP profiles are generated as the profiles referred to above in connection with FIG. 2. However, it is to be understood that the IP addresses and IP profiles referred to herein with respect to FIG. 3 are merely examples of features that can be associated with a network host and a type of profile that may be analyzed or generated, respectively, in order to determine if an identity associated with one of the active network hosts has changed between generated time windows. For example, in other embodiments, the present invention may also determine that an identity based on a MAC address has changed by determining similarity between profiles for different MAC addresses active during two or more time windows. Similarly, in FIG. 4, Host 1, Host 2, and Host N are merely examples and IP addresses could be substituted for the hosts.

In the process illustrated in FIG. 3, two or more time windows are determined at step 310 in the same manner described above with respect to step 210 in FIG. 2. At step 320, a set of IP profiles is generated for the IP addresses detected to be active during a first time window of the two or more time windows. For example, in the diagram of FIG. 4, during a first time window between $T_{i-2}$ to $T_{i-1}$, a first set of profiles 404A, including profile $A_1$, $A_2$ . . . $A_N$, is generated for hosts 502A, 502B . . . 502N active during the first time window. The profiles include data to represent how a user at that particular host 502A, 502B . . . 502N was using the network during that particular time window.

At step 330, a user identifier from a first set of user identifiers is associated with each IP profile included in the set of IP profiles generated at step 320. In some embodiments, the user identifiers may be employee names, numbers, or other identifiers associated with a particular user or employee, but in other embodiments, the identifiers may be any alphanumerical character or string of characters. For example, in some embodiments the identifiers are not associated with any real entity and, instead, are in the form of "unknown entity 1," "unknown entity 2," . . . etc. Associating a different user identifier with each IP profile may involve associating a particular user identifier with a particular host device or IP address, such that a determination may be made as to whether a different user identifier is using that particular host device or IP address during a different time window. In some embodiments, the user identifiers may be linked to a real entity such that the identity of the user at a particular host device or IP address can be determined and/or tracked, but in most embodiments, user identifiers are not linked to a real entity and the user identifiers may be tracked and/or monitored to detect a change in identity at a particular host or IP address and/or to follow an unidentified user over multiple hosts or IP addresses.

At step 340, another set of IP profiles is determined for IP addresses active at another time window from the two or more time windows, such as the next consecutive time window. For example, in the diagram of FIG. 4, a second set of profiles 404B, including profiles $B_1$, $B_2$ . . . $B_N$, is generated for any hosts 502A, 502B . . . 502N active during a second time window from time $T_{i-1}$ to time $T_i$. Then, at step 350, any similarity between IP profiles included in the two generated sets of IP profiles may be determined. For example, any profiles included in the first set of profiles 404A may be compared to any profiles included in the second set of profiles 404B. Comparing the profiles in this manner may allow similar profiles to be associated with each other.

More specifically, if similar profiles are found at the same IP address in different time windows (e.g., if the profiles $A_1$ and $B_1$ on Host 1 are similar) at step 360, then these profiles may be associated with each other by associating both profiles with the same user identifier at step 380. In other words, when profiles from different sets of profiles are determined to be similar, such as in the manner described below, then the IP profile from the latter set of IP profiles may be associated with the same user identifier that its similar IP profile in the first set of IP profiles is associated with.

Alternatively, if at step 360, similar IP profiles are not found at the same IP address, the IP profiles at the same IP address are dissimilar. At step 370, the dissimilar IP profile from the latter set of IP profiles may be compared to all of the IP profiles included in the earlier set of IP profiles to determine if the latter IP profile is similar to any of the IP profiles included in the earlier (e.g., first) set of profiles, regardless of the IP address that the IP profile was generated for. If similarity is found, the latter, dissimilar IP profile may, at step 390 be associated with the user identifier of the similar IP profile from the earlier set of IP profiles. As a more concrete example, in FIG. 4, profile $A_1$ and $B_1$ are generated for host 502A at different time windows. Thus, if profile $B_1$ is determined to be dissimilar to profile $A_1$, profile $B_1$ may be compared to any other profiles included in the first set 404A (e.g., profile $A_2$ to $A_N$). If profile $B_1$ is similar to any of the profiles included in the first set 404A, profile $B_1$ may be associated with the same user identifier as that profile (e.g., profile $B_1$ may be associated with the same user identifier as profile $A_2$ if profile $B_1$ is determined to be similar to profile $A_2$).

If, at step 370, it is determined that the latter dissimilar profile is not similar to any IP profiles from the earlier set of IP profiles, a new user identifier may be associated with the IP profile at step 390. Thus, in the example discussed above, if profile $B_1$ is not similar to any of the profiles included in the first set 404A, then a new user identifier (e.g., a user identifier that is different from user identifiers associated with the first set of profiles 404A) may be associated with profile $B_1$.

In this embodiment, user identifiers are associated with the IP profiles in the manner discussed above with regards to steps 360, 370, 380, and 390 because user behavior is assumed to be stable over time, to a reasonable extent, such that each user exhibits certain repeating patterns, including regularly visiting certain web pages, repeatedly using a certain browser or browsers(s), and accessing the network at certain times of day. In other words, it may be assumed that user behavior is not entirely random. Consequently, when a profile associated with a specific IP address remains similar over multiple discrete time windows, it may be determined that the same user is still associated with that IP address. Meanwhile, if dissimilar profiles are associated with a specific IP address in two different discrete time windows, it may be determined that a different user was associated with the IP address during the two different discrete time windows.

Once all of the profiles included in the latter set of IP profiles are associated with a user identifier, another set of IP profiles may be generated in order to continue monitoring the use of IP addresses in the network. For example, after a second set of IP profiles is generated and associated with user identifiers (either new user identifiers or the same user identifiers associated with a first set of IP profiles), a third set of IP profiles may be generated and compared to the second set of IP profiles in order to determine similarity and assign user identifiers appropriately. Consequently, over time, user identifiers may be mapped to any IP addresses (or network hosts) that a user is using and new user identifiers may be assigned to IP addresses showing behavior that was not present in the previous time window. In some embodiments, new profiles may also be compared to profiles from a number of previous time windows if desired. Thus, even if a new profile is not sufficiently similar to a profile from the previous set of profiles, it may still be given a previously assigned user identifier if the particular profile is sufficiently similar to any profiles previous generated at any previous time windows.

The diagram of FIG. 4 illustrates an embodiment in which network hosts are tracked over three time windows. As can be seen, a set of profiles is generated at each time window: a first set of profiles 404A for a time window spanning from time $T_{i-2}$ to time $T_{i-1}$; a second set of profiles 404B for a time window spanning from time $T_{i-1}$ to time $T_i$; and a third set of profiles 404C for a time window spanning from time $T_i$ to time $T_{i+1}$. In the depicted embodiment, the same hosts—hosts 502A, 502B, and 502N—are active during each time window, however, this is merely an example and it is to be understood that any number of hosts may be active in a network during various time windows. In fact, in some instances, the hosts active during a first time window may be completely distinct from the hosts active during a second time window. Regardless, profiles may be still be generated for each active host during each time window and then the profiles generated at two windows may be compared to determine if the profiles at two different time windows are similar.

In the embodiment depicted in FIG. 4, only one profile is generated for each host during each time window because, as mentioned, it is assumed that users are not changing hosts during time windows. Although this may be accurate in some instances, such as situations where employees use a particular host for an entire work day and the time windows are between eight to twenty four hours long, in other instances this assumption may not hold. Consequently, in some embodiments, the time windows may include multiple shifted time windows of different sizes to model users switching between different network hosts at different times.

Figure 5:
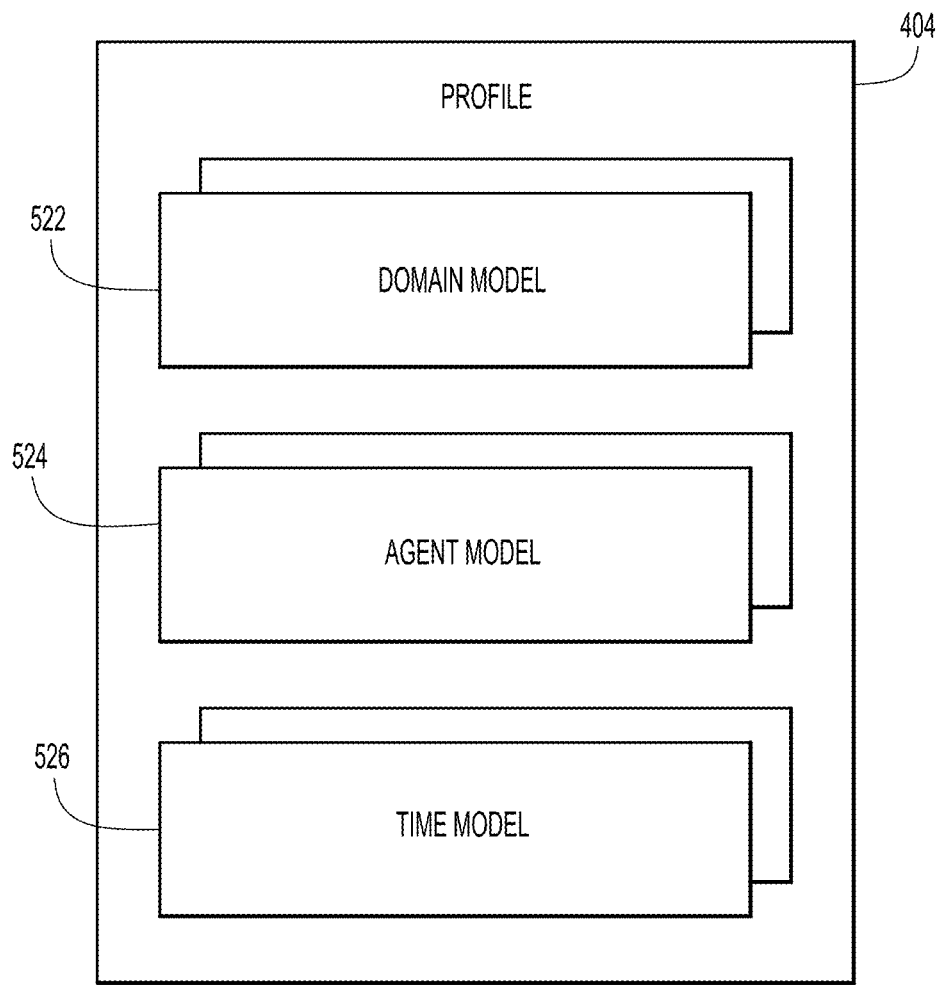
FIG. 5 is a diagram depicting an example profile based on one or more behavior models, according to an example embodiment.

In FIG. 5, a paradigm of an example profile 404 is illustrated. As mentioned above, in some embodiments, the profile may be based on various models or underlying data manipulations. For example, the profile 404 is based on one or more of three behavior models: a domain model 522, an agent model 524, and a time model 526. The combination of two or more of these three models may be useful to model user behavior, however, additional or alternative models or tests may be applied to relevant data for the user change detection provided that model captures user behavior.

The domain model 522 describes a frequency of domain visits. More specifically, the domain model 522 may generate a TF-IDF vector, by calculating frequencies of domains visited by a particular host (or IP address) and weighting the frequencies with inverse document frequency weights. For example, if a first host visited a first domain five times, a second domain two times, and a third domain zero time, while a second host visited the first domain four times, the second domain zero times, and the third domain one time, frequencies of visits (e.g., the TF part of the TF-IDF) may be captured as vectors 5/7, 2/7, 0/7 and 4/5, 0/5, 1/5 for first and second host respectively. Then, the IDF score for each domain is computed (for a single time window or for any number of time windows at once) as the logarithm of the ratio of the total number of network hosts in the network and the number of network hosts from which the domain was visited. Consequently, in the two-host example set forth above, the IDF score of the first domain would be 0 (log(2/2)), and the IDF scores of the second and third domains would be 0.69 (log(2/1)). Finally, using the IDF scores, numerical TF-IDF vectors representing the IP profiles based on the domains visits for IP1 and IP2 can be generated by multiplying the frequency of visits by the IDF score. Again following the same example, the TF-IDF vector for the first network host would be 0, 0.197, 0 (based on 5/7*0=0, 2/7*0.69=0.197, 0/7*0.69=0) and the TF-IDF vector for the second network host would be 0, 0, 0.138 (based on 4/5*0=0, 0/5*0.69=0, 1/5*0.69=0.138).

The agent model 524 describes a frequency of browser usage. Similar to the domain model 522, the agent model 524 is represented by TF-IDF vector which captures frequencies of usages of the User-Agents observed in the network (TF part) and the exclusivity of the User-Agents based on the number of distinct network hosts from which the User-Agent was used (IDF part). As an example, if a first host uses a first browser to send zero requests and a second browser to send seven requests while a second host uses the first browser to send five requests and the second browser to send zero requests, the IDF scores for each browser can be determined to be 0.69 (log(2 total hosts/1 host using each browser)). Using these IDF scores, numerical vectors of 0, 0.69 (0/7*0.69=0, 7/7*0.69=0.69) and 0.69, 0 (5/5*0.69=0.69, 0/5*0.69=0) can be generated for the respective hosts.

The time model 526 describes Internet activity (expressed, in some embodiments, by the amount (number) of requests sent from a particular IP address) as a function of time, in the time window. In particular, time model 526 may capture distribution of activity over a particular time window. In some embodiments, it may not be practical to utilize time model 526, such as if the generated windows are relatively short. However, when model 526 is used, the time window is divided into a given number of sub-windows (e.g., hours in case of one-day time windows) and the vector representing the profile is a histogram of web requests sent from that host with bins determined by the sub-windows (each sub-window is treated as one bin of the histogram). Consequently, the profile is represented as a numerical vector of dimension equal to the number of sub-windows in one time windows whose items express the ratios of requests sent in the corresponding sub-windows from the given IP address.

Figure 6:
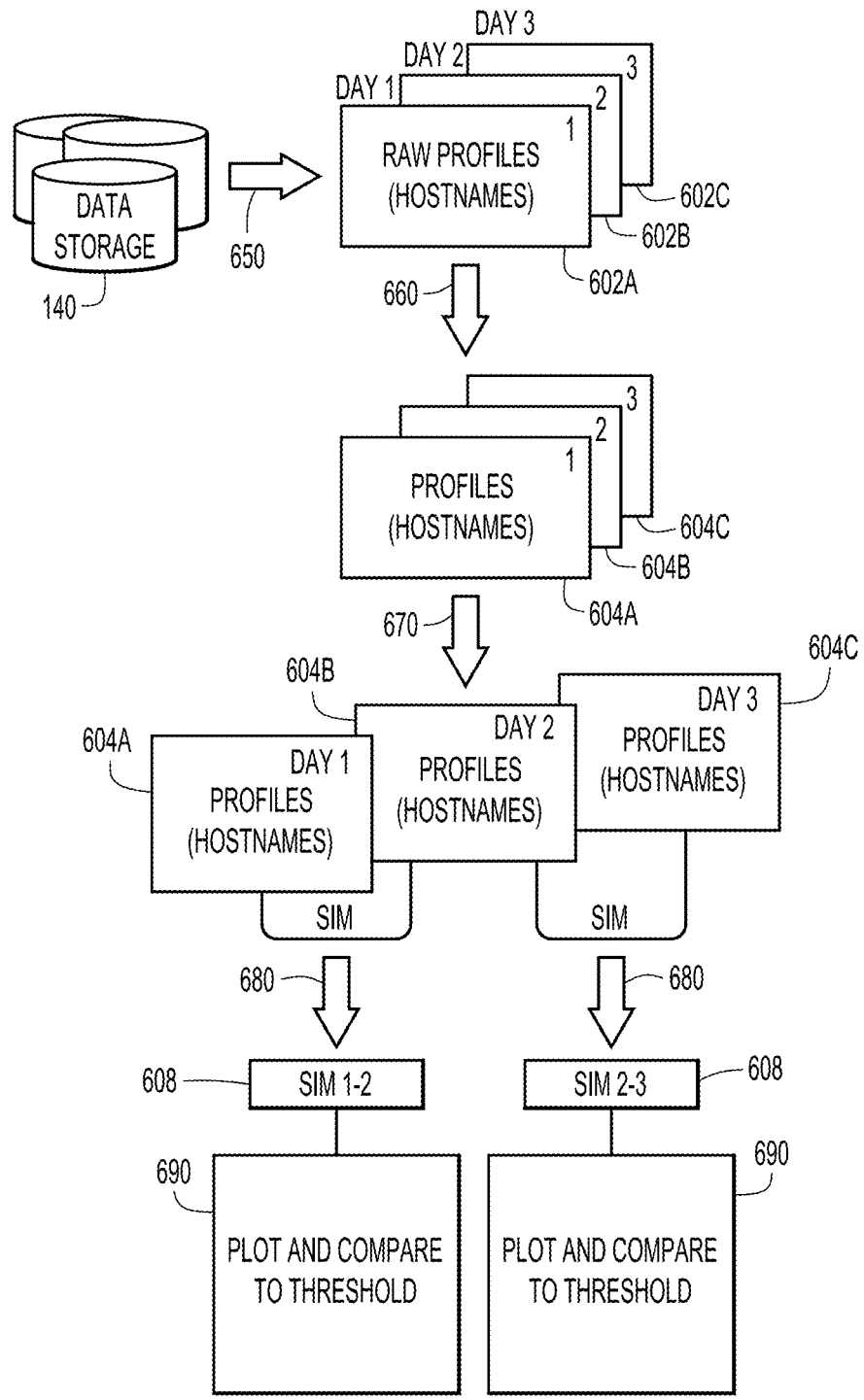
FIG. 6 is a diagram illustrating a process for determining similarity between generated profiles for detected network hosts, according to an example embodiment.

Turning to FIG. 6, a diagram illustrating a process for determining similarity between generated profiles, according to an example embodiment, is shown. Initially, data is extracted from a data storage 140, perhaps via a network 150 by a behavior analysis module 195 stored on a server system 160 (as shown in FIG. 1). The data extracted at step 650 can be sorted into sets of raw profiles 602A, 602B, and 602C based on the time window to which the data belongs (e.g. the data belongs to day 1, day 2, or day 3, as shown in FIG. 6). For example, data from HTTP headers relating to visited domains, agent usage and activity over time may be sorted into sets of raw profiles associated with the appropriate day it was taken from and/or the appropriate network host. In the depicted embodiment, the extracted data relates to three days of Internet usage and is sorted into raw profiles based on the day. Consequently each set of raw profiles 602A, 602B, 602C may contain data relating to multiple hosts.

At step 660, the sets of raw profiles 602A, 602B, and 602C may each be transformed into sets of profiles 604A, 604B, and 604C and each profile (e.g., profiles 404A, 404B, and 404C of FIG. 4) within each set of profiles 604A, 604B, 604C can be associated with the appropriate network host, such as in the manner described with respect to FIG. 4. The transformations convert the raw data into comparable quantities, such as by converting the raw data into vectors representative of models like domain model 522, agent model 524, and time model 526. In other words, transforming the raw data at step 660 may normalize and weight the data included in the profiles of sets 604A, 604B, and 604C at least based on behavior models (e.g., a raw vector may be divided by a norm and weighted in accordance with the TF-IDF operations discussed above). Additionally, at step 660 any profiles with insufficient activity may be removed from the sets of profiles if desired. For example, if a host was only active for one minute of a one-day window and/or accessed only a single domain with a single browser, the profile associated with this host may be removed from the one set of raw profiles 602A, 602B, 602C it is included in so that it is not included in the sets of profiles 604A, 604B, and 604C.

Once the sets of raw profiles 602A, 602B, and 602C are transformed into normalized, weighted sets of profiles 604A, 604B, and 604C (e.g., each profile included in the sets 604A, 604B, 604C may include at least one weighted, normalized vector), the profiles included in the sets of profiles 604A, 604B, and 604C may be compared against at least one other profile in order to determine similarity. In some embodiments, the profiles may include at least one numerical vector produced by a model and, thus, the corresponding numerical vectors of different profiles (e.g., the numerical vectors produced by the domain model for different profiles) can be compared using any number of numerical comparisons. In some embodiments, a weighted average of the cosine similarity (e.g., COSSIM(A, B)=A*B/(||A||||B||), where A and B are two vectors) of the corresponding vectors included in the profiles of the sets of profiles 604A, 604B, and 604C may be taken in order to assign a similarity value 608 to each comparison of profiles (e.g., a similarity value 608 may be assigned to each profile in set 604A for each profile in set 604B). The similarity values produced by the various models may be aggregated together to further assess the similarity of two profiles, as is described below in further detail, but in most embodiments, the similarity vectors are only compared to corresponding similarity vectors and not similarity vectors from different models (e.g., vectors produced by domain models are compared against each other, not against agent vectors). In other words, in some embodiments the profiles are multi-dimensional profiles with multiple vectors and the vectors of a first profile are only compared to like-kind vectors of other profiles. However, in other embodiments, other similarity measures can be used, including similarity measures learned from the data if labeled samples are available. Moreover, in some embodiments, the models 522, 524, 526 may generate data in any desired manner and may determine similarity while transforming the data. For example, instead of generating a Term Frequency-Inverse Document Frequency (TF-IDF) vector to be compared to TF-IDF vectors of other profiles, the domain model 522 could utilize a Jaccard index to determine similarity of raw data.

Figure 7:
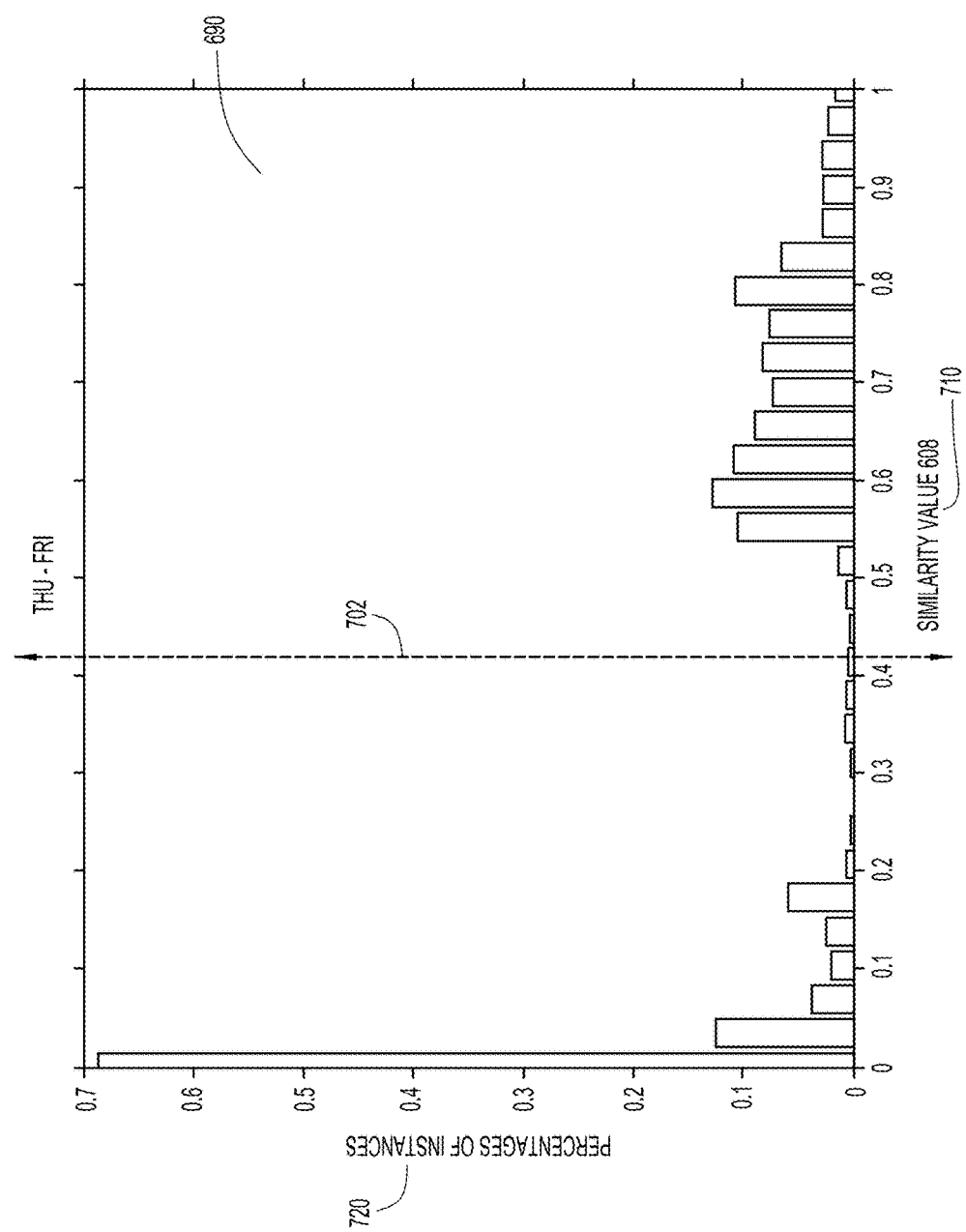
FIG. 7 is a graphical depiction for a comparison of similarity values to a threshold value, according to an example embodiment.

Once similarity values 608 are determined, the similarity values may be compared to a threshold 702 (perhaps by plotting the similarity values against a threshold). The threshold 702 may be used to determine, at step 690, which similarity values indicate true correlation between profiles. FIG. 7 shows an example operation of step 690 in detail. As can be seen in FIG. 7, the similarity value 608 is plotted on a first axis 710 and the percentage of instances is plotted on a second axis 720. Then a threshold value 702 is determined based at least upon the distribution, as discussed in detail below. Once the threshold 702 is determined, any profiles with a similarity value 608 below the threshold 702 are determined to be dissimilar and profiles with a similarity value 608 above the threshold 702 are determined to be similar. Consequently, if one host has profiles at two different time windows with a similarity value 608 above the determined threshold 702, it may be determined that the identity associated with that host is unchanged. By comparison, if the two profiles associated with the same host at two different time windows have a similarity value 608 below the determined threshold 702, it may determined that the identity associated with the host is changed.

In some embodiments, a Naïve Bayes approach is used to determine the threshold 702, but in other embodiments, any threshold generation approach may be used. When the Naïve Bayes approach is used, pairwise similarity of profiles from two time windows are first determined, perhaps in accordance with the aforementioned methods. A low similarity between the profiles generated for a network host at two different time windows indicates that the identity has likely changed. Thus, after determining pairwise similarity, the Bayesian approach may be used to decide whether or not the identity of a network host has changed. More specifically, when the change of the user's identity behind a network host is treated as a binary random variable Changed (e.g., where Changed=1 means that the user has changed) and a decision is made based on the probability of the event that Changed=1 given the similarity (sim) of the profiles for that host between the two time windows, the probability of change can be computed as follows: P(Changed=1|sim)=P(sim|Changed=1)*P(Changed=1)/P(sim). P(Changed=1) is the prior probability that the identity behind a randomly chosen IP address will change between two consecutive time windows, P(sim) is determined from the empirical distribution of similarities of all IP profiles, and P(sim|Changed=1) is the empirical conditional probability distribution of similarities of IP profiles behind which the user has changed. In other words, the probabilities on the right hand side of the equation can be estimated from extracted data. When the Bayesian method is used, the threshold 702 is determined based on comparison of P(Changed=1|sim) and P(Changed=0|sim). A threshold 702 determined in this manner may minimize the risk of making incorrect decisions.

Figure 8:
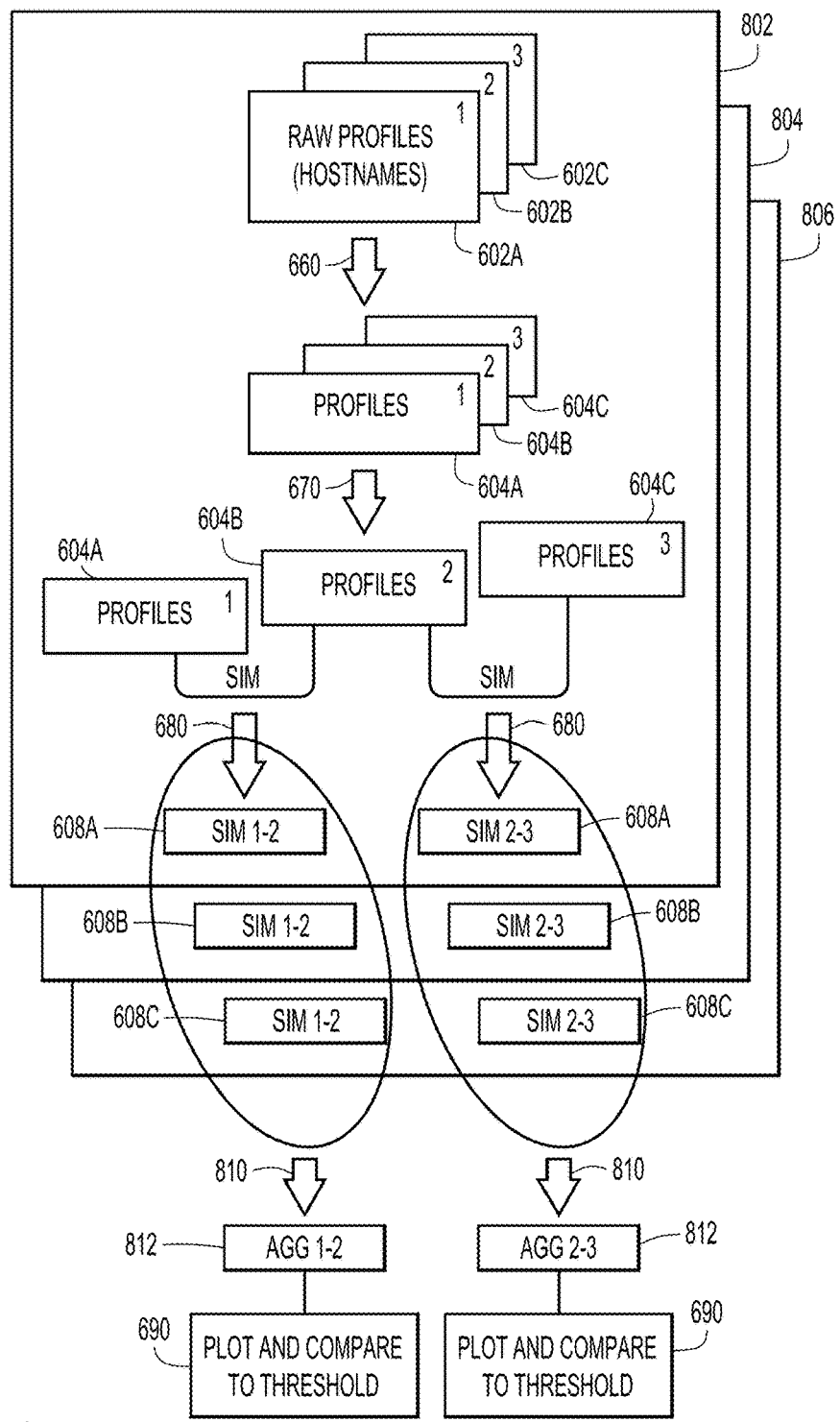
FIG. 8 is a diagram illustrating a process for determining similarity between profiles based on multiple behavior models, according to an example embodiment.
Figure 9:
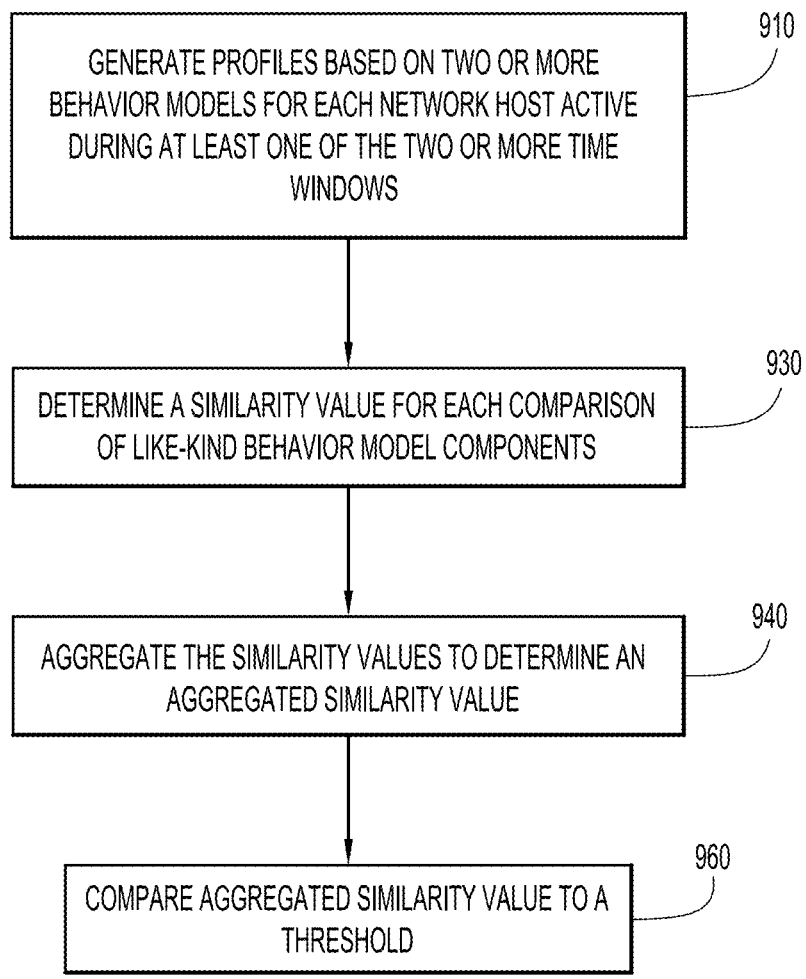
FIG. 9 is a flowchart illustrating a process for determining similarity between profiles based on multiple behavior models, according to an example embodiment.

In some embodiments, similarity values 608 determined for different behavior models may be aggregated in order to further assess the similarity between profiles from two different time windows (e.g., from two different sets). FIGS. 8 and 9 depict a process for aggregating the similarity values. In FIG. 8, the data included in the sets of raw profiles 602A, 602B, and 602C is again transformed to produce sets of normalized, weighted profiles 604A, 604B, and 604C and the profiles included in the sets of normalized, weighted profiles 604A, 604B, and 604C is again compared in the same manner described above with respect to FIG. 6 (e.g., steps 660, 670, and 680 of FIGS. 6 and 8 are equivalent). However, in the process illustrated in FIG. 8, steps 660, 670, and 680 are processed for three different behavior models 802, 804, and 806. In some embodiments, the behavior models may be a domain model, an agent model, and a time model, as shown in FIG. 5, but in other embodiments, any model of user behavior in a network may be used. In other words, in the depicted embodiment, each set of profiles 604A, 604B, and 604C may be based on up to three underlying models and each of the profiles may be compared to other profiles based on their corresponding models to determine corresponding similarity values 608A, 608B, 608C.

Once the similarity values 608A, 608B, 608C are determined for each of the different models of each profile, the similarity values 608A, 608B, 608C corresponding to a single profile may be aggregated together at step 810 to determine an aggregated similarity value 812. In some embodiments, the similarity values 608A, 608B, 608C may be aggregated using an Evangelista aggregation function of $\text{agg}(x)=((1/|F|)*\Sigma_{f \in X_f} + \min_{f \in F}\{x_f\})/2$. In this function, F is the set of the behavior models (e.g., the domain model 522, the agent model 524, and the time model 526, such that $|F|=3$) and $x_f$ is the similarity value corresponding to a single profile x and behavior model f (e.g., the domain model 522, the agent model 524, or the time model 526). Thus, the Evangelista aggregation is an average of average and minimum values. Aggregating the similarity values 608A, 608B, 608C in this manner may suppress poor features, such as similarity values generated by a time model for profiles for relatively short time windows, on a case by case basis.

In FIG. 9, the aggregation process is depicted in a flowchart. At step 910, profiles based on two or more behavior models for each network host active during at least two or more time windows are generated. For example, a profile is generated based on a domain model and an agent model for each active host during two or more time windows. At step 930, the like-kind model components of the profiles are compared and any similarity is determined. For example, a domain vector of a profile for a first network host during a first time window may be compared to a domain vector of profiles for any number of network hosts active during a second time window in order to determine similarity between the first profile and any profiles generated during the second time window. Based on the determined similarity, a similarity value is generated for each like-kind model component of the profiles. For example, a first similarity value may be generated for profiles based on a comparison of their domain vectors and a second similarity value may be generated for the same two profiles based on a comparison of their agent vectors. Then, at step 940, the generated similarity values are aggregated and an aggregated similarity value is generated. The aggregated similarity value may be compared to a threshold at step 960 in the same manner that a single similarity value is compared to a threshold at step 690 described above in connection with FIGS. 6 and 7.

Figure 10:
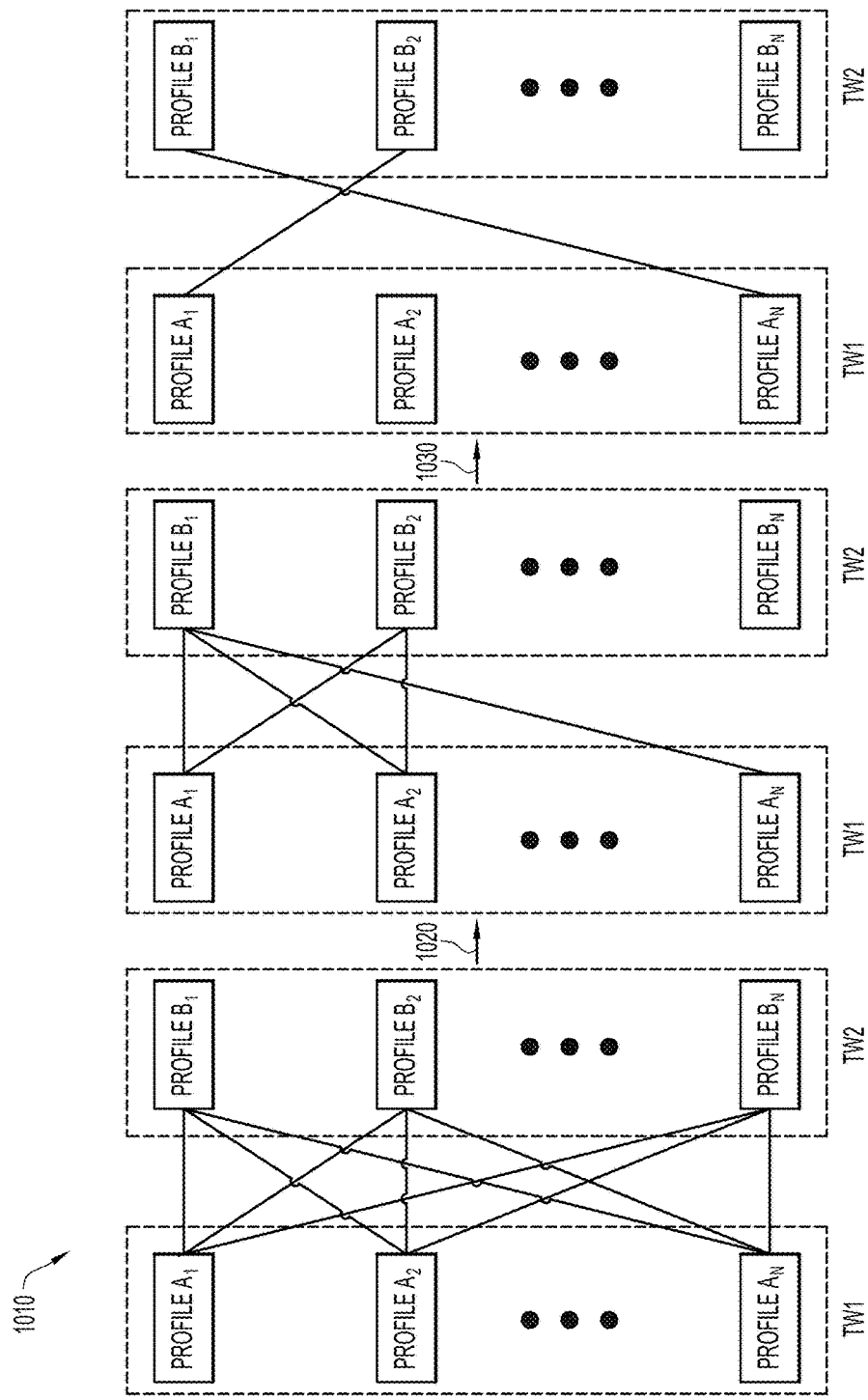
FIG. 10 is a diagram depicting a process for tracking a profile over multiple network hosts, according to an example embodiment.

In light of the aforementioned features and similarity determinations, embodiments of the system and method presented herein can be used to track users over multiple network hosts. A diagram is shown in FIG. 10 that illustrates an example tracking process. First, at 1010, a complete bipartite graph is created where the nodes represent the network hosts from a first time window TW1 (e.g., $T_{i-1}$ to $T_i$) and network hosts from a second time window TW2 (e.g., $T_i$ to $T_{i+1}$). The edges of this graph are weighted by the above-defined similarity values.

Then, at 1020, all the edges with a weight (similarity) smaller than a predefined threshold are pruned. Notably, this predefined threshold, hereinafter referred to as the pruning threshold, is different than the determined threshold 702 and, instead, may be input manually or determined with an algorithm that may determine different thresholds for different nodes. Regardless, pruning the edges with a similarity lower than a pruning threshold may isolate certain nodes. The isolated nodes then represent network hosts addresses behind which a user was only active in only one of the windows TW1, TW2. For example, Profile $B_N$ is an isolated node and represents a network host that was active in time window TW2 but not time window TW1. After the edges are pruned, identities associated with non-isolated profiles can be mapped over the time windows using an algorithm, such as the Hungarian algorithm, at 1030. This algorithm finds a maximum weight matching in a weighted bipartite graph and, thus, is able to map the identities associated with the profiles (and, thus, the network hosts) during time window TW1 to the most similar profiles generated during time window TW2. In the depicted example, the maximum weightings were determined to be between profiles $A_1$ and $B_2$ and profiles $A_N$ and $B_1$. In some embodiments, these mappings can be used to track authorized and unauthorized users, perhaps even prior to applying the Hungarian algorithm (e.g., unauthorized users may be detected with the pruning that occurs at 1020). For example, if a new user identity is determined to be present at a network host only authorized for a certain number or certain group of user identities, an unauthorized user may be detected after pruning at 1020.

There are several advantages to the system and methods presented herein. First, detecting that an identity behind a network host has changed and identifying that an identity has transitioned to a new network host can be accomplished with the methods presented herein using only HTTP logs. Second, these methods achieve high accuracy detection with low computational complexity. Third, tracking users across network hosts may increase awareness of network activity and allow detection of stealthy (rarely communicating) malware on DHCP networks. These methods can track users while preserving privacy at least because the profiles may be created without accessing any sensitive data and/or identifying information. For example, in some embodiments, the system and methods presented herein can operate with fully anonymized data, replacing all strings with integers or hashes. Thus, instead of creating models based on domains and User-Agents, profiles can be created by modeling user hashes with the same results. Finally, these methods can be easily modified for detection of identity hijacking by creating a model for each user (username) in the network where user information is available instead of models for each network host.

To summarize, in one form, a method is provided comprising A method comprising: at a computing apparatus having connectivity to a network, analyzing data representing behavior of active network hosts during two or more time windows; generating a profile for each network host active in the network during the two or more time windows based on the analyzing; determining similarity between the profiles for the two or more time windows; and determining, based on the similarity, that an identity associated with one of the active network hosts during a time window of the two or more time windows has changed.

In another form, an apparatus is provided comprising: a network interface unit configured to enable network communications; and a processor coupled to the network interface unit, and configured to: analyze data representing behavior of active network hosts during two or more time windows; generate a profile for each network host active in the network during the two or more time windows; determine similarity between the profiles for the two or more time windows; and determine, based on the similarity, that an identity associated with one of the active network hosts during a time window of the two or more time windows has changed.

In yet another form, a non-transitory computer-readable storage media is provided encoded with software comprising computer executable instructions and when the software is executed operable to: analyze data representing behavior of active network hosts during two or more time windows; generate a profile for each network host active in the network during the two or more time windows; determine similarity between the profiles for the two or more time windows; and determine, based on the similarity, that an identity associated with one of the active network hosts during a time window of the two or more time windows has changed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a computing apparatus having connectivity to a network, analyzing data included in network traffic logs that represents behavior of active network hosts that were operating at network addresses in the network during at least one of two or more time windows;
generating, based on the analyzing:
a first set of profiles for network addresses on which the active network hosts were operating during a first time window of the two or more time windows; and
a second set of profiles for the network addresses on which the active network hosts were operating during a second time window of the two or more time windows, wherein profiles in the first set of profiles and profiles in the second set of profiles include a plurality of behavior models;
determining similarity between a first profile from the first set of profiles and a second profile from the second set of profiles by comparing, in like-kind, the plurality of behavior models from the first profile and the plurality of behavior models from the second profile; and
mapping an identity that is associated with a first network address of the network addresses that has the first profile during the first time window to a second network address of the network addresses that has the second profile during the second time window, wherein the second network address is different from the first network address, and the mapping comprises:
creating a bipartite graph with: (a) nodes that represent the active network hosts that were operating during the first time window and the second time window; and (b) edges between the nodes that are weighted based on the similarity;
pruning any of the edges with a weight smaller than a pruning threshold so that remaining edges have a similarity greater than or equal to the pruning threshold; and
pruning the remaining edges with an algorithm that determines maximum weight matchings in the remaining edges of the bipartite graph.

2. The method of claim 1, further comprising:
assigning user identifiers to each of the network addresses on which the active network hosts were operating during at least one of the two or more time windows based at least on the similarity.

3. The method of claim 2, wherein the user identifiers assigned to the network addresses during the first time window are from a first set of user identifiers, and the method further comprises:
assigning one of the user identifiers from the first set of user identifiers to the network address on which one of the active network hosts was operating during the second time window based at least on the mapping.

4. The method of claim 2, wherein the user identifiers assigned to the network addresses during the first time window are from a first set of user identifiers and the method further comprises:
assigning the user identifiers from a second set of user identifiers to the network addresses that have profiles from the second set of profiles that are dissimilar from the profiles from the first set of profiles.

5. The method of claim 1, wherein the plurality of behavior models includes at least two of:
a domain model describing a frequency of domain visits;
an agent model describing a frequency of browser usage; or
a time model describing Internet usage as a function of time.

6. The method of claim 5, wherein determining similarity further comprises:
determining a similarity value for each comparison of like-kind behavior models by comparing data from the first profile with data from the second profile;
aggregating the similarity values from each comparison to produce an aggregated similarity value; and
comparing the aggregated similarity value against a threshold.

7. The method of claim 1, further comprising:
detecting unauthorized users accessing the network based on the similarity.

8. The method claim 1, wherein each of the network addresses comprises an Internet Protocol (IP) address.

9. The method of claim 8, further comprising:
detecting that a new user is using a particular IP address based at least on the similarity.

10. An apparatus comprising:
a network interface unit configured to enable network communications; and
a processor coupled to the network interface unit, and configured to:
analyze data included in network traffic logs that represents behavior of active network hosts that were operating at network addresses in a network during at least one of two or more time windows;
generate, based on the analyzing:
a first set of profiles for the network addresses on which the active network hosts were operating during a first time window of the two or more time windows; and
a second set of profiles for the network addresses on which the active network hosts were operating during a second time window of the two or more time windows, wherein profiles in the first set of profiles and profiles in the second set of profiles include a plurality of behavior models;
determine similarity between a first profile from the first set of profiles and a second profile from the second set of profiles by comparing, in like-kind, the plurality of behavior models from the first profile and the plurality of behavior models from the second profile; and
map an identity that is associated with a first network address of the network addresses that has the first profile during the first time window to a second network address of the network addresses that has the second profile during the second time window, wherein the second network address is different from the first network address and the processor is configured to map by:
creating a bipartite graph with: (a) nodes that represent the active network hosts that were operating during the first time window and the second time window; and (b) edges between the nodes that are weighted based on the similarity;
pruning any of the edges with a weight smaller than a pruning threshold so that remaining edges have a similarity greater than or equal to the pruning threshold; and
pruning the remaining edges with an algorithm that determines maximum weight matchings in the remaining edges of the bipartite graph.

11. The apparatus of claim 10, wherein the processor is further configured to:

assign user identifiers to each of the network addresses on which the active network hosts were operating during at least one of the two or more time windows based at least on the similarity.

12. The apparatus of claim 11, wherein the user identifiers assigned to the network addresses during the first time window are from a first set of user identifiers, and the processor is further configured to:
   assign the user identifiers from the first set of user identifiers to the network address on which one of the active network hosts was operating during the second time window based at least on the mapping.

13. The apparatus of claim 11, wherein the user identifiers assigned to the network addresses during the first time window are from a first set of user identifiers, and the processor is further configured to:
   assign the user identifiers from a second set of user identifiers to the network addresses that have profiles from the second set of profiles that are dissimilar from the profiles from the first set of profiles.

14. The apparatus of claim 10, wherein the plurality of behavior models includes at least two of:
   a domain model describing a frequency of domain visits;
   an agent model describing a frequency of browser usage; or
   a time model describing internet usage as a function of time.

15. The apparatus of claim 14, wherein the processor is configured to determine similarity by:
   determining a similarity value for each comparison of like-kind behavior models by comparing data from the first profile with data from the second profile;
   aggregating the similarity values from each comparison to produce an aggregated similarity value; and
   comparing the aggregated similarity value against a threshold.

16. A non-transitory computer-readable storage medium encoded with software comprising computer executable instructions and when the software is executed operable to:
   analyze data included in network traffic logs that represents behavior of active network hosts that were operating at network addresses in a network during at least one of two or more time windows;
   generate, based on the analyzing:
      a first set of profiles for the network addresses on which the active network hosts that were operating during a first time window of the two or more time windows; and
      a second set of profiles for the network addresses on which the active network hosts were operating during a second time window of the two or more time windows, wherein profiles in the first set of profiles and profiles in the second set of profiles include a plurality of behavior models;
   determine similarity between a first profile from the first set of profiles and a second profile from the second set of profiles by comparing, in like-kind, the plurality of behavior models from the first profile and the plurality of behavior models from the second; and
   map an identity that is associated with a first network address of the network addresses that has the first profile during the first time window to a second network address of the network addresses that has the second profile during the second time window, wherein the second network address is different from the first network address and the instructions operable to map comprise instructions operable to:
      create a bipartite graph with: (a) nodes that represent the active network hosts that were operating during the first time window and the second time window; and (b) edges between the nodes that are weighted based on the similarity;
      prune any of the edges with a weight smaller than a pruning threshold so that remaining edges have a similarity greater than or equal to the pruning threshold; and
      prune the remaining edges with an algorithm that determines maximum weight matchings in the remaining edges of the bipartite graph.

17. The computer-readable storage medium of claim 16, further comprising instructions operable to:
   assign user identifiers to each of the network addresses on which the active network hosts were operating during at least one of the two or more time windows based at least on the similarity.

18. The computer-readable storage medium of claim 17, wherein the user identifiers assigned to the network addresses during the first time window are from a first set of user identifiers, and the instructions are further operable to:
   assign one of the user identifiers from the first set of user identifiers to the network address on which one of the active network hosts was operating during the second time window based at least on the mapping; or
   assign the user identifiers from a second set of user identifiers to the network addresses that have profiles from the second set of profiles that are dissimilar from the profiles from the first set of profiles.

19. The computer-readable storage medium of claim 16, wherein the plurality of behavior models includes at least two of:
   a domain model describing a frequency of domain visits;
   an agent model describing a frequency of browser usage; or
   a time model describing internet usage as a function of time.

20. The computer-readable storage medium of claim 19, wherein the instructions operable to determine similarity include instructions operable to:
   determine a similarity value for each comparison of like-kind behavior models by comparing data from the first profile with data from the second profile;
   aggregate the similarity values from each comparison to produce an aggregated similarity value; and
   compare the aggregated similarity value against a threshold.

* * * * *